United States Patent
Ono et al.

(10) Patent No.: US 10,141,114 B2
(45) Date of Patent: Nov. 27, 2018

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Ryo Ono, Tokyo (JP); Tetsuhiko Fukuoka, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 15/488,102

(22) Filed: Apr. 14, 2017

(65) Prior Publication Data

US 2017/0301471 A1   Oct. 19, 2017

(30) Foreign Application Priority Data

Apr. 14, 2016   (JP) .................................. 2016-080787

(51) Int. Cl.
*H01G 4/30* (2006.01)
*H01G 4/12* (2006.01)
*H01G 4/012* (2006.01)
*H01G 4/242* (2006.01)

(52) U.S. Cl.
CPC ............. *H01G 4/30* (2013.01); *H01G 4/012* (2013.01); *H01G 4/12* (2013.01); *H01G 4/242* (2013.01)

(58) Field of Classification Search
None
See application file for complete search history.

(56) References Cited

U.S. PATENT DOCUMENTS

| | | | |
|---|---|---|---|
| 3,189,974 A * | 6/1965 | Fabricius | H01G 4/30 29/25.42 |
| 6,329,311 B1 * | 12/2001 | Fujii | C04B 35/486 361/321.4 |
| 8,804,305 B2 * | 8/2014 | Kim | H01G 4/232 361/311 |
| 2012/0229951 A1 | 9/2012 | Kim | |
| 2012/0234462 A1 | 9/2012 | Matsui et al. | |
| 2012/0236460 A1 * | 9/2012 | Kim | H01G 4/30 361/301.4 |
| 2012/0262840 A1 * | 10/2012 | Koizumi | H01G 4/1209 361/321.2 |
| 2013/0093556 A1 | 4/2013 | Lim | |
| 2014/0301013 A1 * | 10/2014 | Kim | H01G 4/012 361/301.4 |

FOREIGN PATENT DOCUMENTS

| | | |
|---|---|---|
| JP | 2012191164 A | 10/2012 |
| JP | 2012209539 A | 10/2012 |
| JP | 2013-084871 A | 5/2013 |

* cited by examiner

*Primary Examiner* — Dion R Ferguson
(74) *Attorney, Agent, or Firm* — Saliwanchik, Lloyd & Eisenschenk (57) ABSTRACT

A multi-layer ceramic capacitor includes: a body, a first external electrode, and a second external electrode. The body includes a first end surface and a second end surface that face each other, a side surface that extends between the first end surface and the second end surface, a first recess that extends along a first ridge of the first end surface and the side surface, a second recess that extends along a second ridge of the second end surface and the side surface, a first internal electrode that is drawn to the first end surface and the first recess, and a second internal electrode that faces the first internal electrode and is drawn to the second end surface and the second recess. The first external electrode covers the body from the first end surface. The second external electrode covers the body from the second end surface.

8 Claims, 9 Drawing Sheets

MULTI-LAYER CERAMIC CAPACITOR AND METHOD OF PRODUCING THE SAME

CROSS REFERENCE TO RELATED APPLICATION

This application claims priority under 35 U.S.C. § 119 to Japanese Patent Application No. 2016-080787, filed Apr. 14, 2016, which is herein incorporated by reference in its entirety.

BACKGROUND

The present invention relates to a multi-layer ceramic capacitor and a method of producing the multi-layer ceramic capacitor.

Along with miniaturization of electronic devices and achievement of high performance thereof, there have recently been increasingly strong demands for miniaturization and increase in capacity with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Therefore, in such a method of producing a multi-layer ceramic capacitor, as the side margins are made thinner, it is more difficult to ensure insulation properties of the periphery of the internal electrodes.

Japanese Patent Application Laid-open Nos. 2012-209539 and 2012-191164 (hereinafter, referred to as Patent Documents 1 and 2) each disclose a technique of providing side margins in a subsequent step. In other words, in those techniques, a multi-layer sheet is cut to produce a multi-layer chip including internal electrodes exposed to side surfaces of the multi-layer chip, and side margins are then provided to the side surfaces of the multi-layer chip to produce a body.

With this configuration, the body including the side margins each having a uniform thickness is obtained in the techniques disclosed in Patent Documents 1 and 2. Therefore, in the multi-layer ceramic capacitors according to those techniques, insulation properties of the periphery of the internal electrodes can be ensured also when the side margins are made thin so as to enlarge the internal electrodes.

Further, aside from the techniques disclosed in Patent Documents 1 and 2, a technique to improve connection strength of an external electrode to a body is expected for the multi-layer ceramic capacitor. Such a technique can prevent the external electrode from being peeled off from the body, and the multi-layer ceramic capacitor can thus obtain high reliability.

Japanese Patent Application Laid-open No. 2013-84871 (hereinafter, referred to as Patent Document 3) discloses a technique capable of improving connection strength of an external electrode to a body. In this technique, dummy electrodes, which are not connected to internal electrodes, are exposed in regions of a body where external electrodes are provided. In this technique, the external electrodes have good connectivity with the dummy electrodes made of metal, so that connection strength of the external electrode to the body is improved.

BRIEF SUMMARY

However, in the techniques of providing the side margins in a subsequent step, which are disclosed in Patent Documents 1 and 2, it is difficult to dispose the dummy electrodes to the side margins, the dummy electrodes being disclosed in Patent Document 3. Therefore, also in the configuration in which the side margins are provided in a subsequent step, the technique capable of improving the connection strength of the external electrodes to the body is expected.

In view of the circumstances as described above, it is desirable to provide a multi-layer ceramic capacitor and a method of producing the multi-layer ceramic capacitor, which are capable of obtaining high connection strength of an external electrode to a body.

According to an embodiment of the present invention, there is provided a multi-layer ceramic capacitor including a body, a first external electrode, and a second external electrode.

The body includes a first end surface and a second end surface that face each other, a side surface that extends between the first end surface and the second end surface, a first recess that extends along a first ridge of the first end surface and the side surface, a second recess that extends along a second ridge of the second end surface and the side surface, a first internal electrode that is drawn to the first end surface and the first recess, and a second internal electrode that faces the first internal electrode and is drawn to the second end surface and the second recess.

The first external electrode covers the body from the first end surface.

The second external electrode covers the body from the second end surface.

In this configuration, the first recess and the second recess at which the first internal electrode and the second internal electrode are respectively exposed are provided. With this configuration, the first external electrode and the second external electrode are respectively connected to the first internal electrode and the second internal electrode not only on the first end surface and the second end surface but also at the first recess and the second recess. In other words, this configuration can ensure a large region where the first external electrode and the second external electrode are respectively connected to the first internal electrode and the second internal electrode. This can provide high connection strength of the first external electrode and the second external electrode to the body.

The body may further include a side margin that is disposed along the side surface to form the first recess and the second recess together with the first end surface and the second end surface, respectively.

In this configuration, providing the side margin in a subsequent step enables the first recess and the second recess to be easily formed.

The first external electrode and the second external electrode may extend to the side surface.

In this configuration, the first end surface and the second end surface, and the whole of the first internal electrode and the second internal electrode that are respectively exposed at the first recess and the second recess are respectively covered with the first external electrode and the second external electrode. This can ensure a larger region where the first external electrode and the second external electrode are respectively connected to the first internal electrode and the second internal electrode.

A depth of the first recess from the first end surface may be 30% or less of an interval between the first end surface and the second internal electrode, and a depth of the second recess from the second end surface may be 30% or less of an interval between the second end surface and the first internal electrode.

In this configuration, insulation properties between the first external electrode and the second internal electrode and insulation properties between the second external electrode and the first internal electrode are more reliably obtained. This improves moisture resistance in the multi-layer ceramic capacitor, so that high reliability can be obtained.

According to another embodiment of the present invention, there is provided a method of producing a multi-layer ceramic capacitor, the method including: producing a body including a first end surface and a second end surface that face each other, a side surface that extends between the first end surface and the second end surface, a first recess that extends along a first ridge of the first end surface and the side surface, a second recess that extends along a second ridge of the second end surface and the side surface, a first internal electrode that is drawn to the first end surface and the first recess, and a second internal electrode that faces the first internal electrode and is drawn to the second end surface and the second recess; forming a first external electrode that covers the body from the first end surface; and forming a second external electrode that covers the body from the second end surface.

Ceramic sheets may be pressure-bonded to produce a multi-layer chip including the first internal electrode and the second internal electrode.

A side margin extending along the side surface may be formed on the multi-layer chip to produce the body, the body being unsintered.

In this configuration, providing the side margin in a subsequent step enables the first recess and the second recess to be easily formed.

The side margin formed on the multi-layer chip may be dried to shrink, to form the first recess and the second recess.

The body may be subjected to processing to form the first recess and the second recess, the body being unsintered.

The processing may include barrel polishing.

The body may be produced, the body being unsintered and including the side margin that is made of a material having a larger shrinking percentage at sintering than a material of the multi-layer chip.

The body may be sintered to form the first recess and the second recess, the body being unsintered.

The side margin may be made of a material that is easier to generate a liquid phase at sintering than the material of the multi-layer chip.

The side margin may be made of a material having a smaller proportion of base powder than the material of the multi-layer chip.

The side margin may be made of a material having a smaller average particle diameter of base powder than the material of the multi-layer chip.

In those configurations, the recesses can be easily formed in the body in a configuration in which the side margin is provided in a subsequent step.

According to the present invention, it is possible to provide a multi-layer ceramic capacitor and a method of producing the multi-layer ceramic capacitor, which are capable of obtaining high connection strength of an external electrode to a body.

These and other objects, features and advantages of the present invention will become more apparent in light of the following detailed description of embodiments thereof, as illustrated in the accompanying drawings.

DETAILED DESCRIPTION

Hereinafter, embodiments of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-layer Ceramic Capacitor 10

Figure 1:
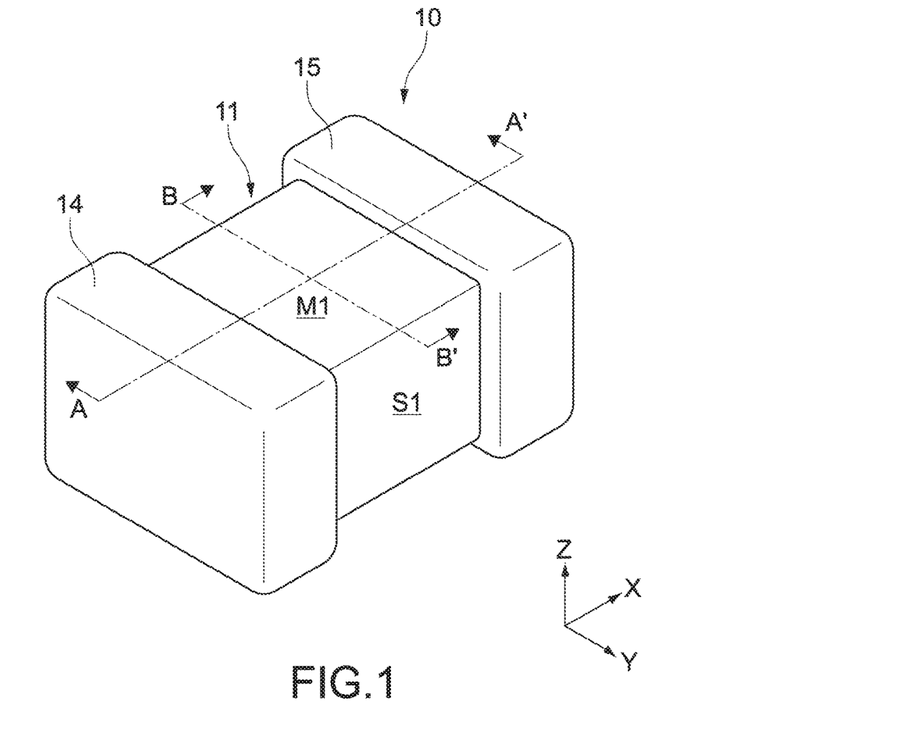
FIG. 1 is a perspective view of a multi-layer ceramic capacitor according to one embodiment of the present invention.
Figure 2:
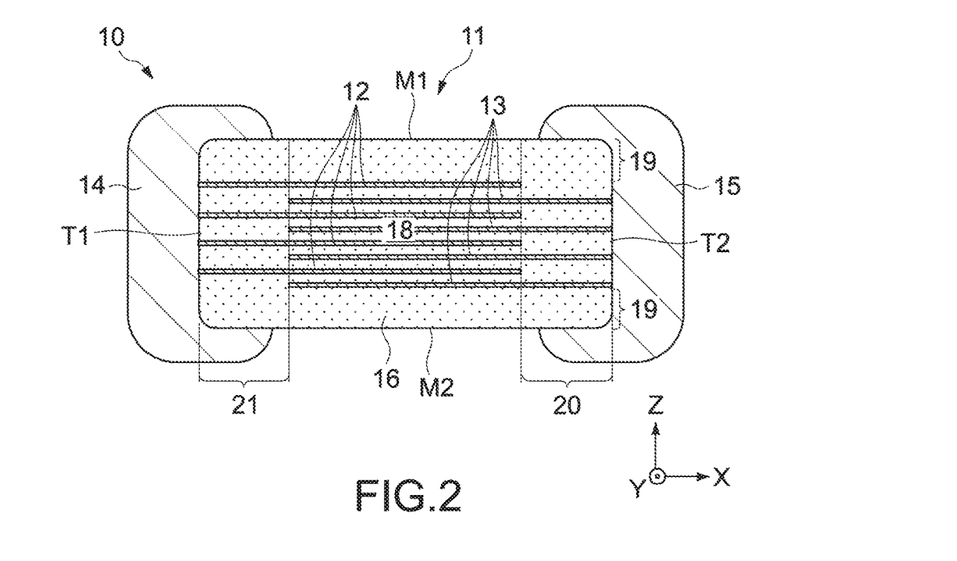
FIG. 2 is a cross-sectional view of the multi-layer ceramic capacitor taken along the A-A' line in FIG. 1.
Figure 3:
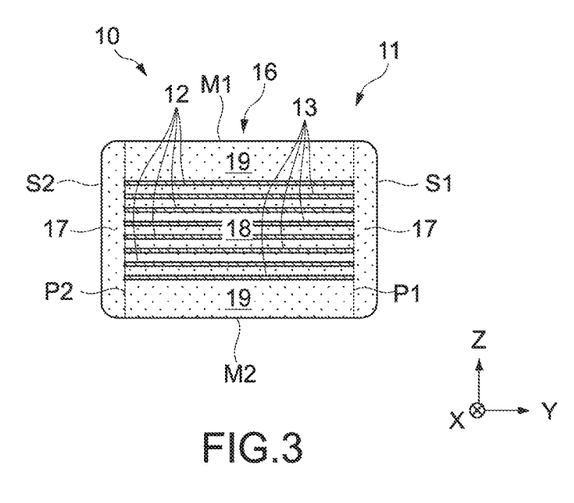
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15. The first external electrode 14 and the second external electrode 15 are apart from each other and face each other in an X-axis direction while sandwiching the body 11 therebetween.

The body 11 has two end surfaces T1 and T2 (hereinafter, also referred to as first end surface T1 and second end surface T2) oriented in the X-axis direction, two side surfaces S1 and S2 oriented in a Y-axis direction, and two main surfaces M1 and M2 oriented in a Z-axis direction. Four ridges connecting the side surfaces S1 and S2 and the main surfaces M1 and M2 of the body 11 are chamfered. Further, four ridges connecting the end surfaces T1 and T2 and the side surfaces S1 and S2 of the body 11 are provided with recesses 22 and 23 (see FIGS. 4 to 6; hereinafter, also referred to as first recess 22 and second recess 23). Detailed configurations of the recesses 22 and 23 will be described later.

A dimension of the body 11 can be optionally determined. For example, in the body 11, a dimension thereof in the X-axis direction can be set to 1.0 mm and dimensions thereof in the Y- and Z-axis directions can be set to 0.5 mm.

It should be noted that the form of the body 11 is not limited to the form as described above. For example, the surfaces of the body 11 may be curved surfaces, and the body 11 may be rounded as a whole.

The first external electrode 14 covers the body 11 from the first end surface T1 and extends to the side surfaces S1 and S2 and the main surfaces M1 and M2, which are connected to the first end surface T1. Further, the second external electrode 15 covers the body 11 from the second end surface T2 and extends to the side surfaces S1 and S2 and the main surfaces M1 and M2, which are connected to the second end surface T2. With this configuration, both of the first external electrode 14 and the second external electrode 15 have U-shaped cross sections in parallel with an X-Z plane and an X-Y plane.

The first external electrode 14 and the second external electrode 15 are each formed from a good conductor and function as terminals of the multi-layer ceramic capacitor 10. Examples of the good conductor forming the first and second external electrodes 14 and 15 include metal mainly containing nickel (Ni), copper (Cu), palladium (Pd), platinum (Pt), silver (Ag), gold (Au), or the like, and an alloy of those metals.

The first and second external electrodes 14 and 15 may have a single-layer structure or multi-layer structure.

The first and second external electrodes 14 and 15 of the multi-layer structure may be formed to have a double-layer structure including a base film and a surface film, or a three-layer structure including a base film, an intermediate film, and a surface film, for example. The base film can be a baked film made of metal mainly containing nickel, copper, palladium, platinum, silver, gold, or the like, or an alloy of those metals, for example.

The intermediate film can be a plating film made of metal mainly containing platinum, palladium, gold, copper, nickel, or the like, or an alloy of those metals, for example.

The surface film can be a plating film made of metal mainly containing copper, tin, palladium, gold, zinc, or the like, or an alloy of those metals, for example.

The body 11 includes a multi-layer chip 16 and side margins 17.

The multi-layer chip 16 includes a capacitance forming unit 18, covers 19, end margins 20 and 21 (hereinafter, also referred to as first end margin 20 and second end margin 21), first internal electrodes 12, and second internal electrodes 13.

The side margins 17 each have a flat plate-like shape extending along the X-Z plane and cover both side surfaces P1 and P2 of the multi-layer chip 16 that are oriented in the Y-axis direction.

The capacitance forming unit 18 is provided at the center portion of the body 11 and is formed to be a functional unit having a function of storing charge of the multi-layer ceramic capacitor 10.

The first end margin 20 and the second end margin 21 are provided to both sides of the capacitance forming unit 18 in the X-axis direction. In other words, the first end margin 20 is disposed between the capacitance forming unit 18 and the second external electrode 15, and the second end margin 21 is disposed between the capacitance forming unit 18 and the first external electrode 14.

The covers 19 each have a flat plate-like shape extending along the X-Y plane and cover both main surfaces of the capacitance forming unit 18 and of the first and second end margins 20 and 21, both the main surfaces being oriented in the Z-axis direction.

The side margins 17 and the covers 19 have main functions of protecting the capacitance forming unit 18 and the first and second end margins 20 and 21 and ensuring insulation properties of the periphery of the capacitance forming unit 18 and the first and second end margins 20 and 21.

The first internal electrodes 12 and the second internal electrodes 13 each have a sheet-like shape extending along the X-Y plane and are alternately disposed along the Z-axis direction. The first internal electrodes 12 are disposed over the capacitance forming unit 18 and the second end margin 21 and connected to the first external electrode 14. The second internal electrodes 13 are disposed over the capacitance forming unit 18 and the first end margin 20 and connected to the second external electrode 15.

Therefore, the first internal electrodes 12 and the second internal electrodes 13 intersect with each other and face each other in the capacitance forming unit 18. Further, the first internal electrodes 12 are separated from the second external electrode 15 by the first end margin 20 and thus insulated from the second external electrode 15. Furthermore, the second internal electrodes 13 are separated from the first external electrode 14 by the second end margin 21 and thus insulated from the first external electrode 14.

The first internal electrodes 12 and the second internal electrodes 13 are each formed from a good conductor and function as internal electrodes of the multi-layer ceramic capacitor 10. Examples of the good conductor forming the first and second internal electrodes 12 and 13 include nickel (Ni), copper (Cu), palladium (Pd), platinum (Pt), silver (Ag), gold (Au), and a metal material including an alloy of those metals.

The capacitance forming unit 18 and the first and second end margins 20 and 21 are made of dielectric ceramics. In the multi-layer ceramic capacitor 10, in order to increase capacitances of respective layers made of dielectric ceramics (hereinafter, also referred to as dielectric ceramic layers) provided between the first and second internal electrodes 12 and 13, dielectric ceramics having a high dielectric constant is used as a material forming the capacitance forming unit 18 and the first and second end margins 20 and 21. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the capacitance forming unit 18 and the first and second end margins 20 and 21 may also include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, or a titanium oxide ($TiO_2$) based material, in addition to the barium titanate based material.

The side margins 17 and the covers 19 are also made of dielectric ceramics. A material of the side margins 17 and the covers 19 only needs to be insulating ceramics, but use of a material having a composition system similar to that of the material of the capacitance forming unit 18 and the first and second end margins 20 and 21 leads to improvement in production efficiency and suppression of internal stress in the body 11.

With the configuration described above, when a voltage is applied between the first external electrode 14 and the second external electrode 15 in the multi-layer ceramic capacitor 10, a voltage is applied to the dielectric ceramic layers between the first and second internal electrodes 12 and 13 in the capacitance forming unit 18. With this configuration, the multi-layer ceramic capacitor 10 stores charge corresponding to the voltage applied between the first external electrode 14 and the second external electrode 15.

It should be noted that the configuration of the multi-layer ceramic capacitor 10 is not limited to a specific configuration, and a well-known configuration can be used as appropriate in accordance with the size and performance expected for the multi-layer ceramic capacitor 10. For example, the number of first internal electrodes 12 and second internal electrodes 13 in the capacitance forming unit 18 can be determined as appropriate.

2. Detailed Configuration of Recesses 22 and 23

Figure 4:
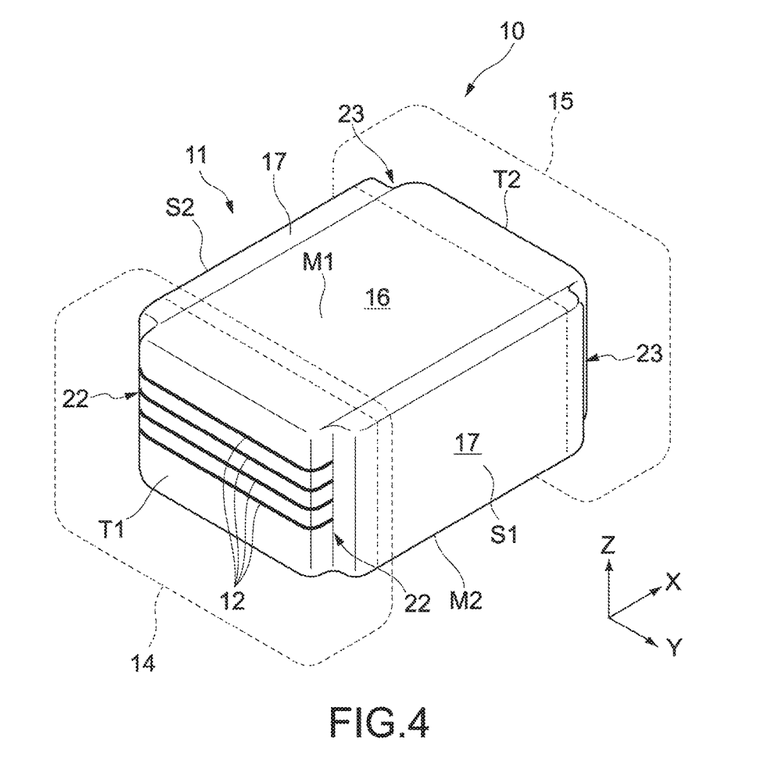
FIG. 4 is a perspective view of a body of the multi-layer ceramic capacitor.
Figure 5:
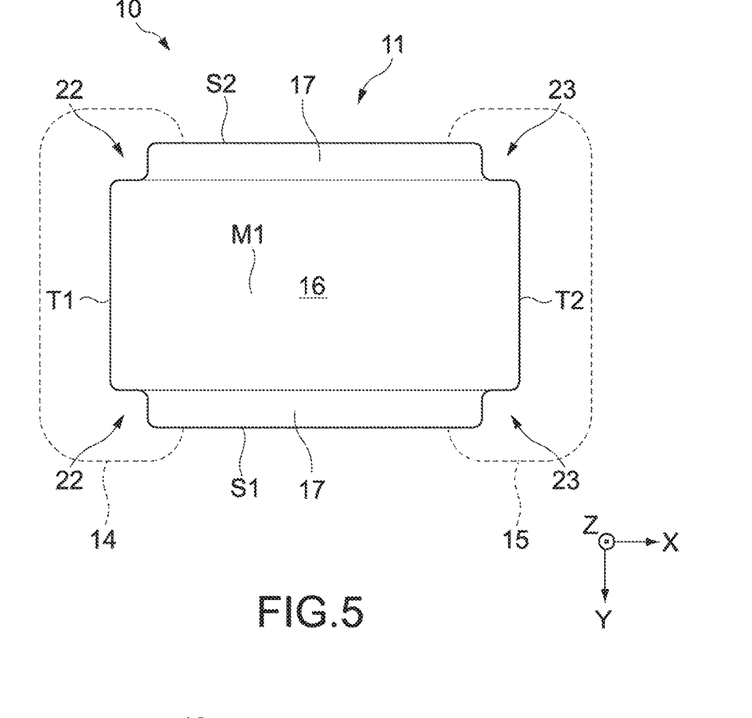
FIG. 5 is a plan view of the body of the multi-layer ceramic capacitor.
Figure 6:
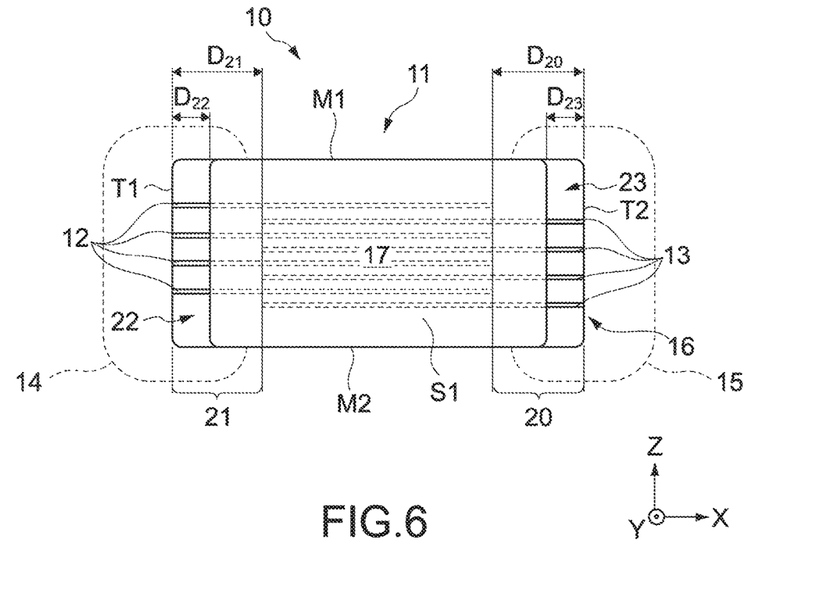
FIG. 6 is a side view of the body of the multi-layer ceramic capacitor.

FIGS. 4 to 6 are views of the body 11 seen through the first and second external electrodes 14 and 15 of the multi-layer ceramic capacitor 10. FIG. 4 is a perspective view of the body 11. FIG. 5 is a plan view of the body 11. FIG. 6 is a side view of the body 11. FIGS. 4 to 6 each show general forms of the first and second external electrodes 14 and 15 by broken lines.

The body 11 includes the first recesses 22 that extend in the Z-axis direction along first ridges of the first end surface T1 and the side surfaces S1 and S2. Further, the body 11 includes the second recesses 23 that extend in the Z-axis direction along second ridges of the second end surface T2 and the side surfaces S1 and S2. The first and second recesses 22 and 23 are each provided over the entire width of the body 11 in the Z-axis direction and form respective grooves recessed from the end surfaces T1 and T2 and the side surfaces S1 and S2.

The first recess 22 and the second recess 23 are provided on both sides of the side margin 17 in the X-axis direction. In other words, the side margin 17 has a smaller dimension than that of the multi-layer chip 16 in the X-axis direction and is disposed at an interval from each of the end surfaces T1 and T2 of the multi-layer chip 16. With this configuration, side surfaces P1 and P2 of the second end margin 21 are exposed at the first recesses 22, and side surfaces P1 and P2 of the first end margin 20 are exposed at the second recesses 23.

The first external electrode 14 covers the first recesses 22, and the second external electrode 15 covers the second recesses 23. As a result, the first external electrode 14 is connected to the first internal electrodes 12 not only on the first end surface T1 but also at the first recesses 22. Further, the second external electrode 15 is connected to the second internal electrodes 13 not only on the second end surface T2 but also at the second recesses 23. In such a manner, in the multi-layer ceramic capacitor 10, the body 11 is provided with the first and second recesses 22 and 23, so that a large region where the first and second external electrodes 14 and 15 are respectively connected to the first and the second internal electrodes 12 and 13 can be ensured.

The first and second internal electrodes 12 and 13 made of a metal material can be connected to the first and second external electrodes 14 and 15 more firmly than the first and second internal electrodes 12 and 13 made of dielectric ceramics. As a result, in the multi-layer ceramic capacitor 10, high connection strength of the first and second external electrodes 14 and 15 to the body 11 is obtained. Therefore, in the multi-layer ceramic capacitor 10, the first and second external electrodes 14 and 15 can be prevented from being peeled off from the body 11, and high reliability is thus obtained.

Further, in the multi-layer ceramic capacitor 10, contact areas of the first and second external electrodes 14 and 15 and the first and second internal electrodes 12 and 13 are increased. Thus, contact resistance of the first and second external electrodes 14 and 15 and the first and second internal electrodes 12 and 13 is reduced. As a result, in the multi-layer ceramic capacitor 10, equivalent series resistance (ESR) can be reduced.

FIG. 6 shows a depth $D_{22}$ of the first recess 22 from the first end surface T1, a depth $D_{23}$ of the second recess 23 from the second end surface T2, a dimension $D_{20}$ of the first end margin 20 in the X-axis direction, and a dimension $D_{21}$ of the second end margin 21 in the X-axis direction.

The depth $D_{22}$ of the first recess 22 is smaller than the dimension $D_{21}$ of the second end margin 21. This can prevent the first external electrode 14 from being short-circuited with the second internal electrodes 13 within the first recess 22.

Similarly, the depth $D_{23}$ of the second recess 23 is smaller than the dimension $D_{20}$ of the first end margin 20. This can prevent the second external electrode 15 from being short-circuited with the first internal electrodes 12 within the second recess 23.

As the depth $D_{22}$ of the first recess 22 and the depth $D_{23}$ of the second recess 23 become large, a large region where the first and second external electrodes 14 and 15 are respectively connected to the first and the second internal electrodes 12 and 13 can be ensured. More specifically, as the depth $D_{22}$ of the first recess 22 and the depth $D_{23}$ of the second recess 23 are increased, connection strength between the body 11 and the first and second external electrodes 14 and 15 increases in a linear manner. For that reason, from the standpoint of improvement in connection strength between the body 11 and the first and second external electrodes 14 and 15, it is desirable that the depth $D_{22}$ of the first recess 22 and the depth $D_{23}$ of the second recess 23 be large.

Meanwhile, as the depth $D_{22}$ of the first recess 22 becomes large, the first external electrode 14 within the first recess 22 comes closer to the second internal electrodes 13. Further, as the depth $D_{23}$ of the second recess 23 becomes large, the second external electrode 15 within the second recess 23 comes closer to the first internal electrodes 12. As a result, as the depth $D_{22}$ of the first recess 22 and the depth $D_{23}$ of the second recess 23 become large, an insulation failure due to moisture in the atmosphere is easier to occur when the multi-layer ceramic capacitor 10 is operated, for example.

For those reasons, in the body 11, the depth $D_{22}$ of the first recess 22 is desirably kept to 30% or less of the dimension $D_{21}$ of the second end margin 21, and the depth $D_{23}$ of the second recess 23 is desirably kept to 30% or less of the dimension $D_{20}$ of the first end margin 20. With this configuration, in the multi-layer ceramic capacitor 10, an insulation failure due to moisture resistance can be effectively prevented from occurring, and high reliability is thus obtained.

3. Method of Producing Multi-Layer Ceramic Capacitor 10

Figure 7:
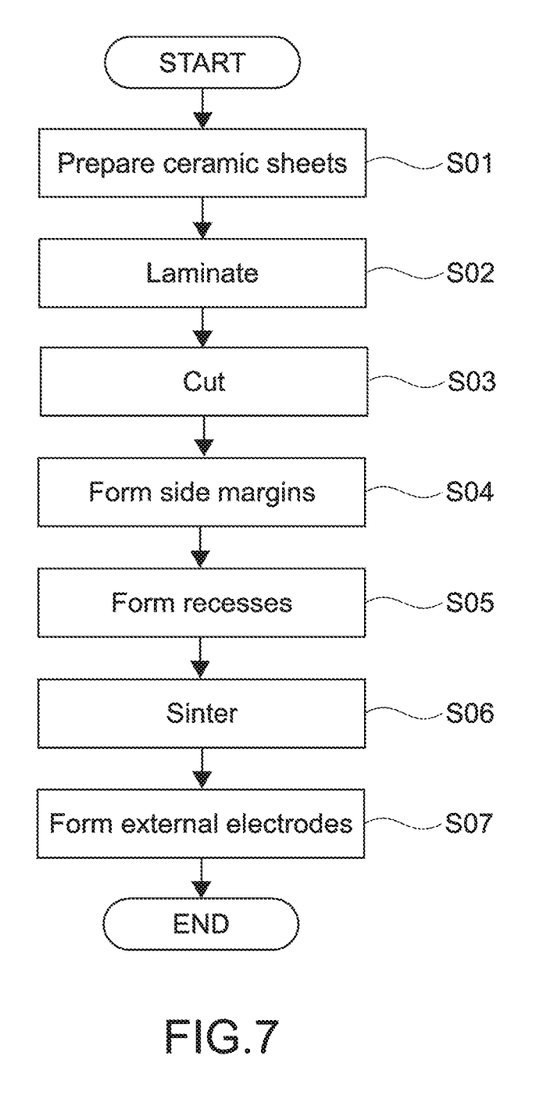
FIG. 7 is a flowchart showing a method of producing the multi-layer ceramic capacitor.

FIG. 7 is a flowchart showing a method of producing the multi-layer ceramic capacitor 10. FIGS. 8A to 13 are views each showing a production process of the multi-layer ceramic capacitor 10. Hereinafter, the method of producing the multi-layer ceramic capacitor 10 will be described along FIG. 7 with reference to FIGS. 8A to 13 as appropriate.

3.1 Step S01: Preparation of Ceramic Sheets

In Step S01, first ceramic sheets 101 and second ceramic sheets 102 for forming the capacitance forming unit 18 and the first and second end margins 20 and 21, and third ceramic sheets 103 for forming the covers 19 are prepared.

Figure 8A:
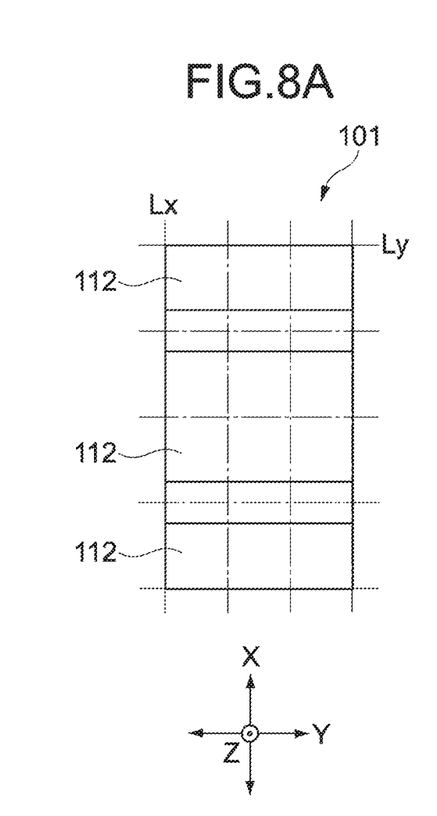
FIGS. 8A, 8B, and 8C are plan views of ceramic sheets prepared in Step S01 of the production method.
Figure 8B:
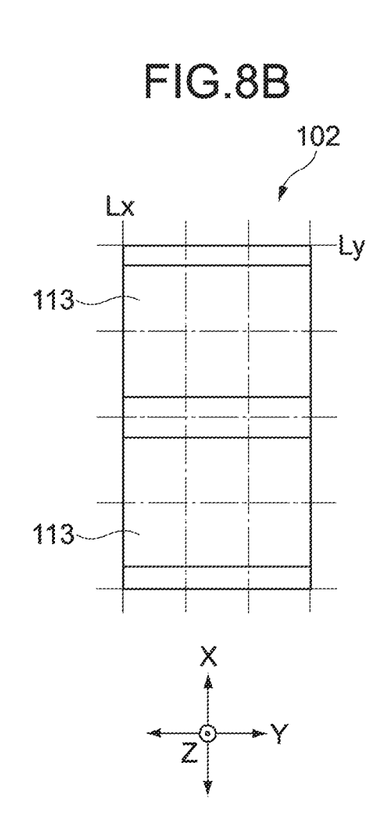
Figure 8C:
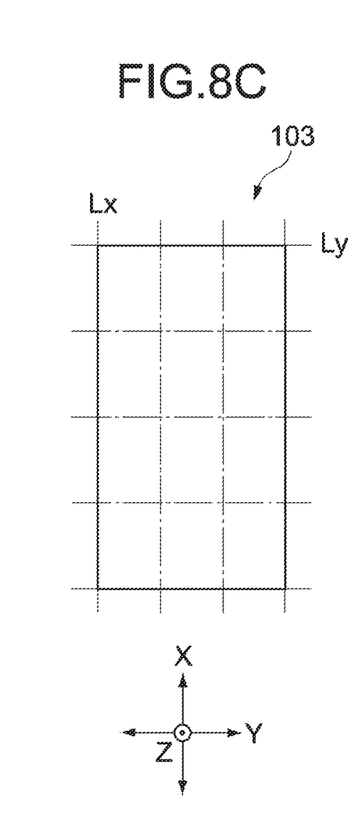

FIGS. 8A, 8B, and 8C are plan views of the first, second, and third ceramic sheets 101, 102, and 103, respectively. FIG. 8A shows the first ceramic sheet 101, FIG. 8B shows the second ceramic sheet 102, and FIG. 8C shows the third ceramic sheet 103. The first, second, and third ceramic sheets 101, 102, and 103 are configured as unsintered dielectric green sheets and each formed into a sheet shape by using a roll coater or a doctor blade, for example.

At the stage of Step S01, the first, second, and third ceramic sheets 101, 102, and 103 are not yet cut into the multi-layer ceramic capacitors 10. FIGS. 8A, 8B, and 8C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 8A, 8B, and 8C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 19.

The first and second internal electrodes 112 and 113 can be formed using any electrical conductive paste. For formation of the first and second internal electrodes 112 and 113 by use of an electrical conductive paste, a screen printing method or a gravure printing method can be used, for example.

Each of the first and second internal electrodes 112 and 113 is disposed over two regions and extends like a belt in the Y-axis direction. The two regions are adjacent to each other in the X-axis direction and divided by the cutting line Ly. The first internal electrodes 112 are shifted from the second internal electrodes 113 in the X-axis direction by one row including the regions divided by the cutting lines Ly. In other words, the cutting line Ly passing through the center of the first internal electrode 112 passes through a region between the second internal electrodes 113, and the cutting line Ly passing through the center of the second internal electrode 113 passes through a region between the first internal electrodes 112.

3.2 Step S02: Lamination

Figure 9:
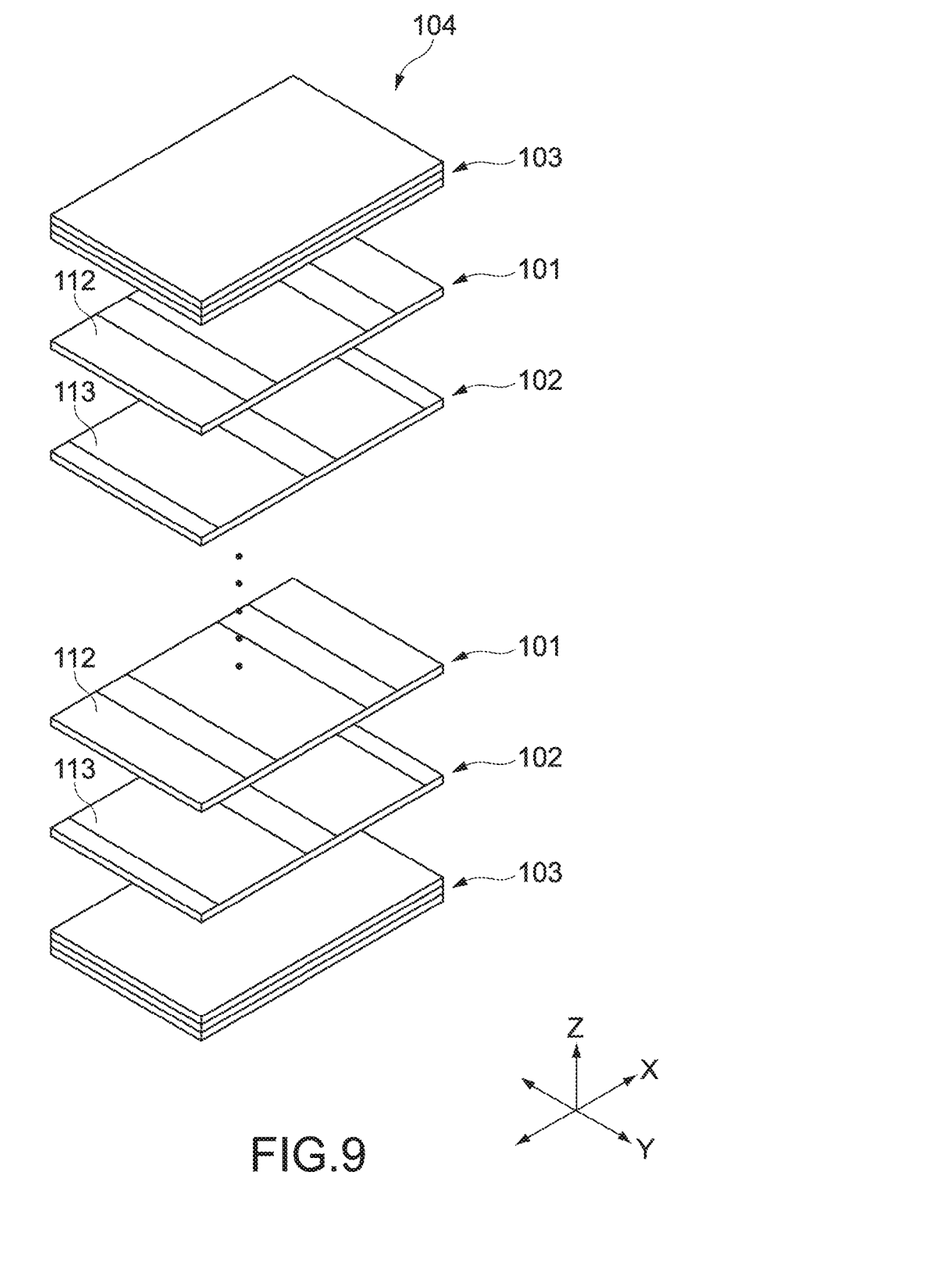
FIG. 9 is a perspective view of a multi-layer sheet in Step S02 of the production method.

In Step S02, the first, second, and third ceramic sheets 101, 102, and 103 prepared in Step S01 are laminated, to produce a multi-layer sheet 104.

FIG. 9 is a perspective view of the multi-layer sheet 104 obtained in Step S02. For the purpose of description, FIG. 9 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 18 and the first and second end margins 20 and 21 are alternately laminated in the Z-axis direction.

Further, in the multi-layer sheet 104, the third ceramic sheets 103 corresponding to the covers 19 are laminated on the uppermost and lowermost surfaces of the first and second ceramic sheets 101 and 102 alternately laminated in the Z-axis direction. It should be noted that in the example shown in FIG. 9 three third ceramic sheets 103 are laminated on each of the uppermost and lowermost surfaces of the laminated first and second ceramic sheets 101 and 102, but the number of third ceramic sheets 103 can be changed as appropriate.

3.3 Step S03: Cutting

Figure 10:
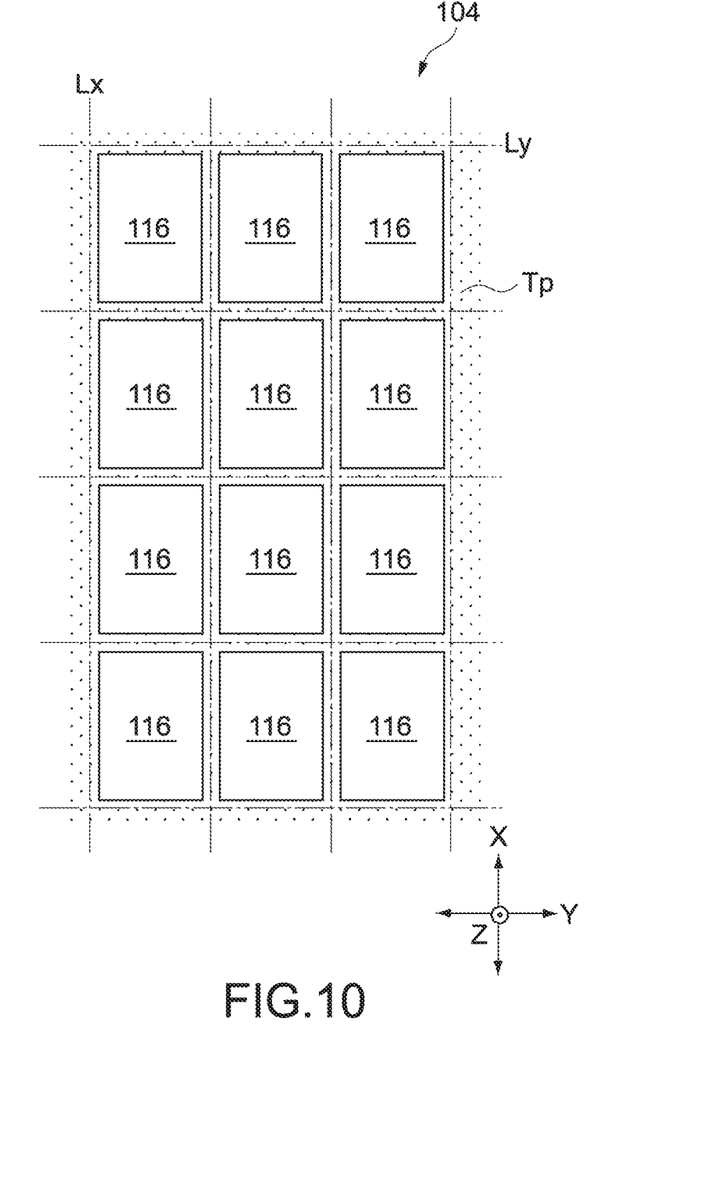
FIG. 10 is a plan view of the multi-layer sheet in S03 of the production method.
Figure 11:
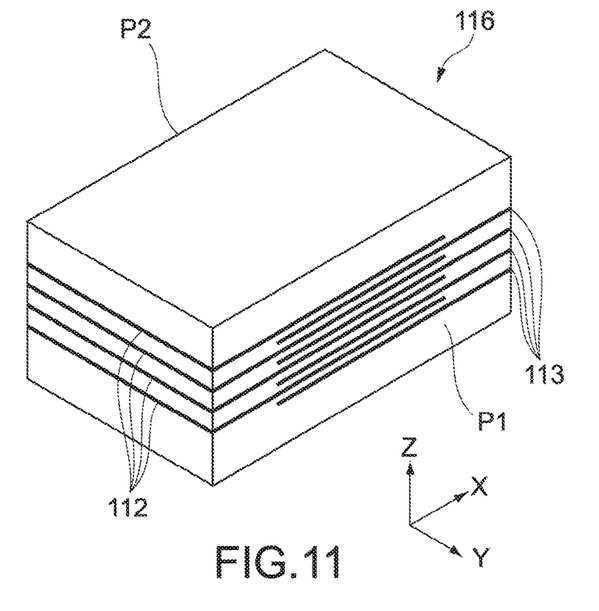
FIG. 11 is a perspective view of a multi-layer chip after Step S03 of the production method.

In Step S03, the multi-layer sheet 104 obtained in Step S02 is cut to produce unsintered multi-layer chips 116.

FIG. 10 is a plan view of the multi-layer sheet 104 after Step S03. The multi-layer sheet 104 is cut along the cutting lines Lx and Ly while being attached to a tape Tp as a holding member.

With this configuration, the multi-layer sheet 104 is singulated, and multi-layer chips 116 shown in FIG. 11 are obtained. In each of the multi-layer chips 116, cut surfaces on which the first and second internal electrodes 112 and 113 are exposed, i.e., the side surfaces P1 and P2, are formed.

A method of cutting the multi-layer sheet 104 is not limited to a specific method. For example, for the cutting of the multi-layer sheet 104, a technique using various blades can be used. Examples of the blades usable for the cutting of the multi-layer sheet 104 include a push-cutting blade and a rotary blade (e.g., dicing blade). Further, for the cutting of the multi-layer sheet 104, for example, laser cutting or water jet cutting can be used in addition to the technique using various blades.

The cut multi-layer chips 116 are cleansed as needed, to remove grinding dust or the like adhering to the side surfaces P1 and P2 or the like.

3.4 Step S04: Formation of Side Margins

Figure 12:
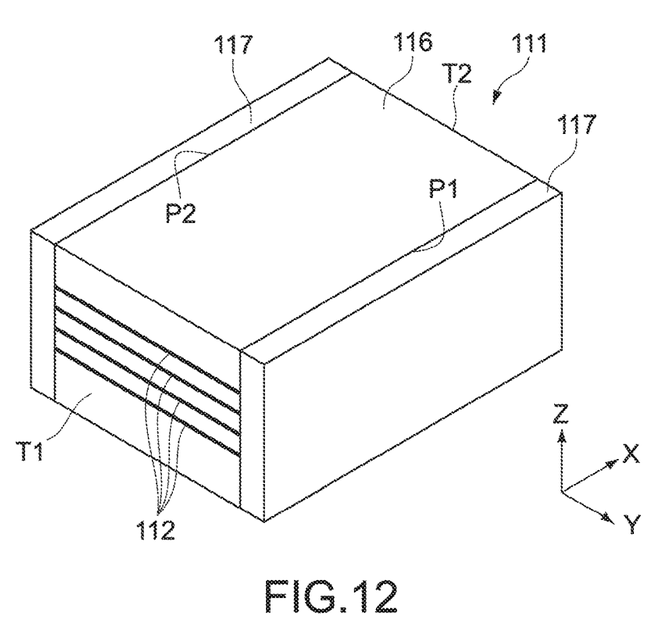
FIG. 12 is a perspective view of a body after Step S04 of the production method.

In Step S04, unsintered side margins 117 are formed on the side surfaces P1 and P2 of the multi-layer chip 116 obtained in Step S03.

The side margins 117 can be formed by, for example, stamping ceramic sheets with use of the side surfaces P1 and P2 of the multi-layer chip 116 or applying ceramic slurry to the side surfaces P1 and P2 of the multi-layer chip 116. Examples of a method of applying the ceramic slurry to the side surfaces P1 and P2 of the multi-layer chip 116 include a dipping method.

As described above, an unsintered body 111 as shown in FIG. 12 is obtained.

A form of the unsintered body 111 can be determined in accordance with a form of a sintered body 11. For example, in order to obtain the body 11 with the size of 1.0 mm×0.5 mm×0.5 mm, the unsintered body 111 with the size of 1.2 mm×0.6 mm×0.6 mm can be produced.

3.5 Step S05: Formation of Recesses

Figure 13:
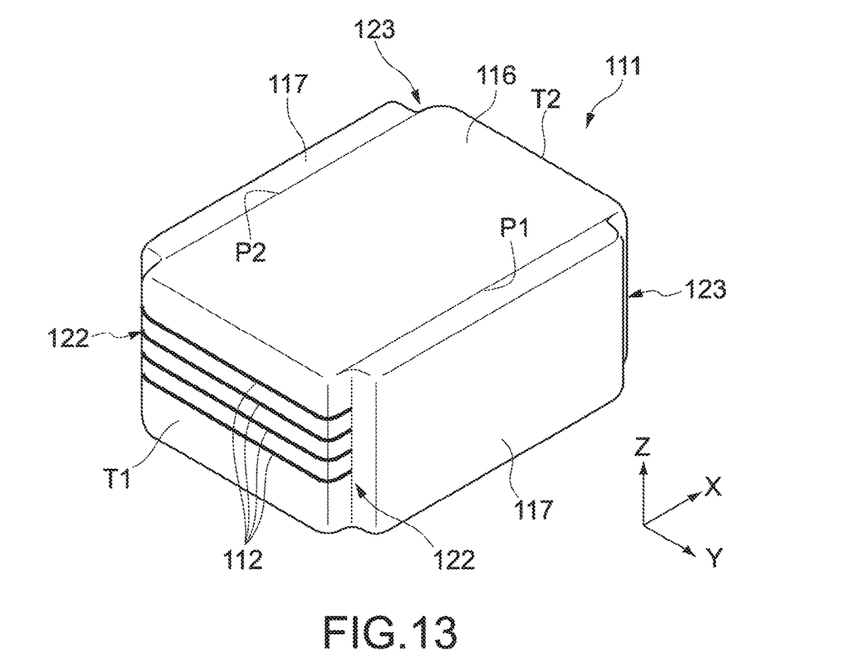
FIG. 13 is a perspective view of the body after Step S05 of the production method.

In Step S05, recesses 122 and 123 are formed in the unsintered body 111 shown in FIG. 12 obtained in Step S04, to produce the unsintered body 111 shown in FIG. 13. Step S05 can be executed by various methods, and an example thereof will be described as follows.

For example, the side margins 117 of the unsintered body 111 shown in FIG. 12 are dried to shrink in the X-axis direction, so that the recesses 122 and 123 of the unsintered body 111 shown in FIG. 13 can be formed. In order to cause the side margins 117 to easily shrink at the drying, the side margins 117 are desirably formed by application of ceramic slurry in Step S04 (formation of side margins).

Alternatively, processing for forming the recesses 122 and 123 in the unsintered body 111 shown in FIG. 12 is performed, so that the unsintered body 111 shown in FIG. 13 can be produced. Examples of the processing for forming the recesses 122 and 123 in the unsintered body 111 include barrel polishing, laser irradiation, and sandblasting. Besides, the recesses 122 and 123 may be formed by pressing the side margins 117 to be deformed.

In one example, a method of performing barrel polishing on the unsintered body 111 shown in FIG. 12 to form the recesses 122 and 123 will be described. The barrel polishing can be executed by, for example, putting the unsintered bodies 111, a polishing medium, and liquid into a barrel container and imparting rotational motions or vibrations to the barrel container.

As described above, the multi-layer chip 116 achieves high density by hydrostatic pressing, uniaxial pressing, or the like in Step S02 performed before the cutting in Step S03. Meanwhile, in Step S04, in order to prevent the layers of the multi-layer chip 116 from being peeled off, a large pressure is not applied to the side margins 117 formed on the multi-layer chip 116. Thus, the side margins 117 are not provided with high density.

Therefore, in the unsintered body 111 shown in FIG. 12, the side margins 117 have a lower density than that of the multi-layer chip 116. As a result, when the unsintered body 111 shown in FIG. 12 is subjected to barrel polishing, the side margins 117 having a low density are worn more largely than the multi-layer chip 116 having a high density. With this configuration, in the unsintered body 111 shown in FIG. 13 obtained after the barrel polishing, both ends of the side margins 117 in the X-axis direction are largely worn, so that the recesses 122 and 123 are formed.

It should be noted that in the unsintered body 111 shown in FIG. 13 obtained after the barrel polishing both ends of the side margins 117 in the Z-axis direction may also be largely worn in addition to both the ends of the side margins 117 in the X-axis direction. This allows recesses extending in the X-axis direction to be formed at both sides of the side margins 117 in the Z-axis direction.

3.6 Step S06: Sintering

In Step S06, the unsintered body 111 shown in FIG. 13 obtained in Step S05 is sintered to produce the body 11 of the multi-layer ceramic capacitor 10 shown in FIGS. 1 to 6. Sintering can be performed in a reduction atmosphere or a low-oxygen partial pressure atmosphere, for example.

3.7 Step S07: Formation of External Electrodes

In Step S07, the first external electrode 14 and the second external electrode 15 are formed on the body 11 obtained in Step S06, to produce the multi-layer ceramic capacitor 10 shown in FIGS. 1 to 6.

In Step S07, first, an unsintered electrode material is applied so as to cover the body 11 from one of the end surfaces T1 and T2 and then applied so as to cover the body 11 from the other one of the end surfaces T1 and T2. With this configuration, the body 11 is covered with the unsintered electrode material from each of the end surfaces T1 and T2.

A method of applying the unsintered electrode material is not limited to a specific method as long as the unsintered electrode material can be filled into the first and second recesses 22 and 23 of the body 11. Examples of the method of applying the unsintered electrode material include a dipping method.

Next, the unsintered electrode material applied to the body 11 is subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the treatment in Step S07 described above may be performed before Step S06. For example, before Step S06, the unsintered electrode material may be applied to the unsintered body 111 from the end surfaces T1 and T2, and in Step S06, the unsintered body 111 may be sintered and, simultaneously, the unsintered electrode material may be baked to form base layers of the first external electrode 14 and the second external electrode 15.

3.8 Modified Example

In the method of producing the multi-layer ceramic capacitor 10, Step S05 (formation of recesses) is not obligatory. In other words, if the unsintered body 111 previously including the recesses 122 and 123 shown in FIG. 14 is obtained in Step S04 (formation of side margins), it is unnecessary to form the recesses 122 and 123 posteriori.

Figure 14:
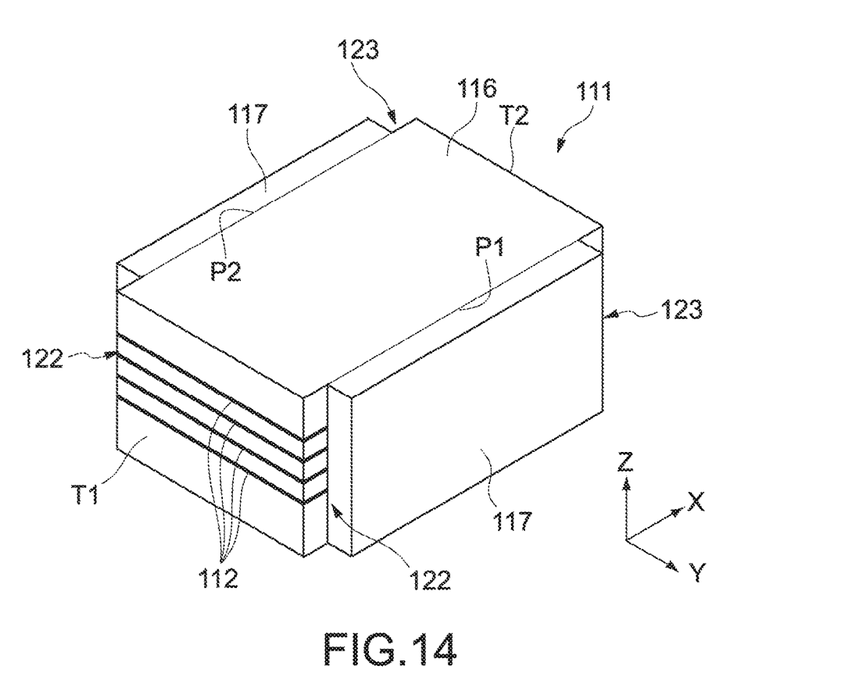
FIG. 14 is a perspective view of a body of a modified example of the production method.

For example, when the side margins 117 that are short in the X-axis direction are disposed on the side surfaces P1 and P2 of the multi-layer chip 116, the unsintered body 111 shown in FIG. 14 is obtained. Further, also when conditions for stamping ceramic sheets with use of the side surfaces P1 and P2 of the multi-layer chip 116 are adjusted such that the side margins 117 become short in the X-axis direction, the unsintered body 111 shown in FIG. 14 is obtained.

Further, in the body 111 before sintering, the side margins 117 are made of a material having a larger shrinking percentage at sintering than a material of the multi-layer chip 116. This eliminates the necessity of forming the recesses 122 and 123 in the body 111 obtained before sintering. In this case, the side margins 117 shrink more largely than the multi-layer chip 116 at the sintering, and the first and second recesses 22 and 23 are thus formed in the body 11 obtained after the sintering.

In this regard, for example, the side margins 117 can be made of a material that is easier to generate a liquid phase at sintering than that of the multi-layer chip 116. In this case, the side margins 117 can contain a larger amount of silicon oxide, boron nitride, or the like, which forms a glass component, than that of the multi-layer chip 116.

Further, in the side margins 117, it is also effective to make a proportion of base powder, which becomes a solid component after sintering, smaller than that of the multi-layer chip 116.

Furthermore, in the side margins 117, it is also effective to make an average particle diameter of the base powder smaller than that of the multi-layer chip 116.

4. Other Embodiments

While the embodiment of the present invention has been described above, the present invention is not limited to the embodiment described above, and it should be appreciated that the present invention may be variously modified.

For example, in the embodiment described above, the first and second recesses 22 and 23 are each formed over the entire width of the body 11 in the Z-axis direction, but the first and second recesses 22 and 23 only need to expose at least one of the first internal electrodes 12 and the second internal electrodes 13. For example, the first and second recesses 22 and 23 may be provided in only regions corresponding to the first and second end margins 20 and 21 of the body 11 and may not be provided in regions corresponding to the covers 19.

Further, in the multi-layer ceramic capacitor 10, it is desirable to provide the first and second recesses 22 and 23 to all of the four ridges of the end surfaces T1 and T2 and side surfaces S1 and S2 of the body 11 as described in the above embodiment, but this configuration is not obligatory. In other words, in the multi-layer ceramic capacitor 10, if the first and second recesses 22 and 23 are provided to at least one of the four ridges of the body 11, effects of the embodiment can be obtained.

Furthermore, in the multi-layer ceramic capacitor 10, it is desirable that the first and second external electrodes 14 and 15 extend to the side surfaces S1 and S2 of the body 11 beyond the first and second recesses 22 and 23 as described in the above embodiment, but this configuration is not obligatory. In other words, if the first and second external electrodes 14 and 15 respectively cover at least part of the first and second recesses 22 and 23 and are respectively connected to the first and second internal electrodes 12 and 13 within the first and second recesses 22 and 23, effects of the embodiment can be obtained.

What is claimed is:

1. A multi-layer ceramic capacitor, comprising:
   a body including
      a first end surface and a second end surface that face each other,
      a side surface that extends between the first end surface and the second end surface,
      a first recess that extends along a first ridge of the first end surface and the side surface,
      a second recess that extends along a second ridge of the second end surface and the side surface,
      a first internal electrode that is drawn to the first end surface and the first recess, and
      a second internal electrode that faces the first internal electrode and is drawn to the second end surface and the second recess;
   a first external electrode that covers the body from the first end surface; and
   a second external electrode that covers the body from the second end surface,
   wherein a depth of the first recess from the first end surface is 30% or less of an interval between the first end surface and the second internal electrode, and a depth of the second recess from the second end surface is 30% or less of an interval between the second end surface and the first internal electrode.

2. The multi-layer ceramic capacitor according to claim 1, wherein
   the body further includes a side margin that is disposed along the side surface to form the first recess and the second recess together with the first end surface and the second end surface, respectively.

3. The multi-layer ceramic capacitor according to claim 1, wherein
   the first external electrode and the second external electrode extend to the side surface.

4. A method of producing a multi-layer ceramic capacitor, comprising:
   producing a body including
      a first end surface and a second end surface that face each other,
      a side surface that extends between the first end surface and the second end surface,
      a first recess that extends along a first ridge of the first end surface and the side surface,
      a second recess that extends along a second ridge of the second end surface and the side surface,
      a first internal electrode that is drawn to the first end surface and the first recess, and
      a second internal electrode that faces the first internal electrode and is drawn to the second end surface and the second recess;
   forming a first external electrode that covers the body from the first end surface; and
   forming a second external electrode that covers the body from the second end surface,
   wherein ceramic sheets are pressure-bonded to produce a multi-layer chip including the first internal electrode and the second internal electrode,
   wherein a side margin extending along the side surface is formed on the multi-layer chip to produce the body, the body being unsintered, and
   wherein the side margin formed on the multi-layer chip is dried to shrink, to form the first recess and the second recess.

5. The method of producing a multi-layer ceramic capacitor according to claim 4, wherein
   the unsintered body is produced, the body including the side margin that is made of a material having a larger shrinking percentage at sintering than a material of the multi-layer chip, and
   the method further comprises sintering the unsintered body to form the first recess and the second recess after forming the side margin on the multi-layer chip.

6. The method of producing a multi-layer ceramic capacitor according to claim 5, wherein
   the side margin is made of a material that is easier to generate a liquid phase at sintering than the material of the multi-layer chip.

7. The method of producing a multi-layer ceramic capacitor according to claim 5, wherein
   the side margin is made of a material having a smaller proportion of base powder than the material of the multi-layer chip.

8. The method of producing a multi-layer ceramic capacitor according to claim 5, wherein
   the side margin is made of a material having a smaller average particle diameter of base powder than the material of the multi-layer chip.

* * * * *